United States Patent [19]

Patterson

[11] Patent Number: 5,013,123
[45] Date of Patent: May 7, 1991

[54] STAMPED PRECISION LIGHTGUIDE INTERCONNECT CENTERING ELEMENT

[75] Inventor: Richard A. Patterson, Georgetown, Tex.

[73] Assignee: Minnesota Mining and Manufacturing Company, St. Paul, Minn.

[21] Appl. No.: 437,027

[22] Filed: Nov. 15, 1989

Related U.S. Application Data

[63] Continuation-in-part of Ser. No. 305,471, Feb. 1, 1989, abandoned, which is a continuation of Ser. No. 182,872, Apr. 18, 1988, Pat. No. 4,824,197.

[51] Int. Cl.$^5$ .................................................. G02B 6/38
[52] U.S. Cl. .................................. 350/96.21; 350/96.20
[58] Field of Search ................ 350/96.20, 96.21, 96.22

[56] References Cited

U.S. PATENT DOCUMENTS

| | | | |
|---|---|---|---|
| 3,864,018 | 2/1975 | Miller | 350/96.10 |
| 4,029,390 | 6/1977 | Chinnock et al. | 350/96.10 |
| 4,077,702 | 3/1978 | Kunze et al. | 350/96.21 |
| 4,254,865 | 3/1981 | Pacey et al. | 206/316 |
| 4,274,708 | 6/1981 | Cocito et al. | 350/96.21 |
| 4,339,172 | 7/1982 | Leather | 350/96.21 |
| 4,353,620 | 10/1982 | Schultz | 350/96.21 |
| 4,391,487 | 7/1983 | Melman et al. | 350/96.20 |
| 4,435,038 | 3/1984 | Soes et al. | 350/96.21 |
| 4,593,971 | 6/1986 | Clement et al. | 350/96.20 |
| 4,729,619 | 3/1988 | Blomgren | 350/96.21 |
| 4,824,197 | 4/1989 | Patterson | 350/96.21 |

FOREIGN PATENT DOCUMENTS

| | | |
|---|---|---|
| 0065096 | 3/1982 | European Pat. Off. . |
| 52-19547 | 2/1977 | Japan . |
| 53-26142 | 3/1978 | Japan . |
| 58-9114 | 1/1983 | Japan . |
| 58-158621 | 9/1983 | Japan . |

Primary Examiner—William L. Sikes
Assistant Examiner—Akm E. Ullah
Attorney, Agent, or Firm—Donald M. Sell; Walter N. Kirn; John C. Barnes

[57] ABSTRACT

Elements for making butt splices in optical fibers formed of a deformable material, e.g. metal or polymeric materials, can be formed to define three surfaces for contacting the fibers to be spliced. The surfaces are formed between two legs of an element such that when the legs are closed onto the fibers, the surfaces center the fibers by embedding the fibers into the surfaces and afford a resilient spring compression reserve force on the aligned fibers to maintain them in contact and clamp the fibers in the element.

24 Claims, 5 Drawing Sheets

STAMPED PRECISION LIGHTGUIDE INTERCONNECT CENTERING ELEMENT

RELATED APPLICATIONS

This application is a continuation-in-part of application Ser. No. 07/305,471 now abandoned, which application was a continuation of application Ser. No. 07/182,872, filed Apr. 18, 1988, now U.S. Pat. No. 4,824,197.

BACKGROUND OF THE INVENTION

1. Field of the Invention

This invention relates to optical fiber splicing elements and in one aspect to an improved optical fiber centering and holding device to afford the splicing of and alignment of ends of optical fibers.

2. Description of the Prior Art

The art is becoming replete with devices for centering optical fibers for the purpose of aligning ends of optical fibers for splicing the ends of fibers for continued transmission of light rays along the fibers. The optical fiber used in the telecommunications industry is mostly a single mode glass fiber. This fiber typically contains a 8 $\mu m \pm 1$ $\mu m$ diameter central glass core through which t optical signal is transmitted. The core is surrounded by a glass cladding which has a diameter of 125 $\mu m \pm 3$ $\mu m$. The cladding has a slightly different index of refraction than the core.

There are a number of prior art devices which have been designed to make permanent connections or splices in single mode glass fiber. To function properly and produce a low loss splice, these devices must align the core portions of the two fiber ends being spliced to within approximately 10% of their core diameter or less than 1 $\mu m$.

Some of the prior art devices attempt to achieve fiber end centering and alignment by forcing the fibers into a non-conformable "V" groove or between nonconformable rods. These devices function satisfactorily as long as the fibers being spliced are the same diameter. Examples of such devices are disclosed in U.S. Pat. Nos. 4,029,390; 4,274,708; and 4,729,619.

When the fibers to be spliced have diameters at opposite ends of the tolerance range (122 $\mu m$ and 128 $\mu m$), the non-conformable "V" groove type devices have difficulty providing the required core alignment precision.

Other prior art devices urge the two fiber center lines into alignment with one another by locating the fiber ends between three equally spaced ductile or elastomeric surfaces. These surfaces create an equilateral triangular cross-sectional channel into which the fibers are positioned. The junction between the fiber ends is located usually at the mid point of the channel. These devices provide better performance than the non-conformable "V" groove type devices because they are better able to accommodate differences in fiber diameters. Examples of these devices are found in U.S. Pat. Nos. 4,391,487; 4,435,038; and 4,593,971.

Another prior art patent is U.S. Pat. No. 4,339,172 which utilizes a foldable grip member that is placed within an elastomeric sleeve which affords compressive forces against the grip member to assert pressure on the grip member to grip each of the cables at a number of equally-spaced points around its periphery.

The device of the present invention utilizes three contact surfaces which form a fiber centering channel as do other prior art devices, but the device contains easily definable functional and performance improvements over the prior art. These differences in structure and means of operation are discussed below.

The splicing element of the present invention provides three high precision fiber contact surfaces and at least one of which is movable in relationship to the others on an integral actuation structure affording such movement in a single easy to manufacture part. The fiber clamping surfaces are initially spaced apart to allow fibers to be easily inserted into a progressively narrowing channel or passageway until the end faces are in contact. This structure makes it easy to detect by tactile feedback and/or buckling in the opposing fiber when the first fiber is pushed against the opposing fiber in the passageway. When the fiber ends are in contact, the splice element is closed and the fiber ends are aligned and clamped.

Other prior art devices such as the device of U.S. Pat. No. 4,391,487 and the commercial form sold by the assignee of U.S. Pat. No. 4,391,487 utilizes molded elastomer blocks for centering and aligning the fiber. These blocks contain an essentially triangular cross-sectional passageway which is slightly smaller than the diameter of the fibers. When the fibers are inserted into the molded passageway, they are required to force the elastomer surfaces open by elastically deforming the elastomer contact surfaces. This requires significant compressive force on the fiber to push it into the passageway. Because of this high insertion force, it is often difficult to tell when the fiber end faces are actually in contact inside the splice. Additionally, it is possible to easily break the fibers under compressive buckling as they are forced into the elastomeric centering blocks.

Only very small ductile or elastic deformation of the fiber locating surfaces is required in the splice element of the present invention to provide precise fiber centering and clamping. This deformation creates no external material flow parallel to the axis of the fiber and produces no ductile deformation of the hinged structure around the clamping surfaces. Other prior art devices such as the connector of U.S. Pat. No. 4,435,038 require extremely large deformations of the fiber clamp surfaces and surrounding structure to produce fiber centering and clamping. Unfortunately, these large deformations may result in unwanted distortion of and unequal clamp forces on the fiber engaging surfaces. This in turn may also produce shifting of the fiber center lines and axial separation of the fiber end faces.

Forces high enough to embed the fiber uniformly into each of the clamping surfaces of the splicing element of the present invention by ductile deformation can be generated easily through the hinged lever structure afforded by the legs of the splicing element. Once clamped, the splicing element maintains uniform compressive loads on the fibers which result in high fiber tensile load retention, and excellent thermal cycling stability. The fiber clamp forces are maintained by elastic energy stored in the legs of the splicing element as well as in the clamping structure. Other prior art devices such as the connector of U.S. Pat. No. 4,435,038 tend to relax or elastically recover slightly after removal of the splice crimping tool forces. This relaxation may result in a slight loosening of the fiber in the locating channel which can lead to reduced pull out forces as well as fiber end face separation during thermal cycling.

During the fiber centering and splicing process in the splicing element of the present invention, clamping loads are generated on the fiber. Since glass has very high compressive strength, these loads tend to embed the fibers into the three ductile contact surfaces forming the fiber channel in the element. These clamping loads on the fiber cladding result in excellent tensile load retention capabilities and thermal cycling stability for the splice. In addition, the application of the clamping load is easily and quickly accomplished simply by squeezing together the legs of the splice element. Other prior art devices such as the fiber centering device of U.S. Pat. No. 4,391,487 require adhesives to bond the fiber to the external splice structure beyond the fiber centering blocks. These adhesives can be difficult and time consuming to apply and to cure uniformly.

The splicing element of the present invention has also been designed to permit reopening and release of the fiber ends. If it becomes necessary to reposition fibers within the splice, the clamping force provided on the legs of the element can be easily removed, and the elastic memory in the element legs and hinge sections will cause the fiber locating and clamping surfaces to move apart. The clamping loads on the fibers are then released, and the fibers can be repositioned. Other prior art devices such as the connectors of U.S. Pat. Nos. 4,391,487 and 4,435,038 are permanently crimped or adhesively bonded and cannot be reopened.

SUMMARY OF THE INVENTION

The present invention provides a deformable splice element for use in butt splicing two optical fibers which generally have different diameters due to manufacturing tolerances. The element is formed of deformable material and comprises means defining three generally planar fiber supporting surfaces disposed with each surface positioned at an acute angle to a second surface and defining an optical fiber passageway therebetween adapted to receive two fiber ends in abutting relationship to be spliced together. The passageway has a generally triangular cross-section and means are provided for supporting at least one of said fiber supporting surfaces for movement in relationship to the other fiber supporting surfaces to draw one of said supporting surfaces toward the other two of the surfaces with sufficient force to engage two fiber ends and cause each of the fiber supporting surfaces to deform uniformly around the fiber ends with the larger of the fiber ends being embedded uniformly into each of the three fiber supporting surfaces to a slightly greater depth than the smaller diameter fiber. Thus, the variations in fiber diameter due to manufacturing tolerances are accommodated and the result is the two fiber ends are brought into coaxial alignment and the fiber ends are clamped with sufficient compressive force to restrict the fiber ends from separating, unless an unusual amount of force is applied to the fibers, and insufficient force to be deleterious to the ends of the optical fibers.

In one embodiment, two of the three fiber supporting surfaces are formed on one plate-like member of the element and the third fiber supporting surface is formed on a second plate-like member which is movable about a fold to press the fiber ends into the two surfaces on the other plate-like member. The plate-like members are like legs and the fiber support surfaces form the alignment passage.

The splice element is formed of an integral piece of deformable material to result in a small sheet, examples of such material being metals or polymeric material, having sufficient elastic yield strength to apply the clamping forces on the fiber ends.

BRIEF DESCRIPTION OF THE DRAWING

The present invention will be further described with reference to the accompanying drawing, wherein.

DESCRIPTION OF THE PREFERRED EMBODIMENT

The present invention will be described with reference to the accompanying drawing wherein FIGS. 1 through 6 illustrate the splice element generally designated 11 which comprises a sheet 12 of ductile, deformable, elastic material. The sheet 12 has a pair of parallel grooves 14 and 15 formed generally centrally thereof which grooves define therebetween a rib 16 having an optical fiber supporting surface 18. The sheet 12 has edge portions 20 and 21 on either side of the grooves 14 and 15 which form legs that serve as means for drawing opposed surfaces on the sheet toward each other to align the axes of fibers positioned on the supporting surface 18 into compressive engagement therewith.

Figure 5:
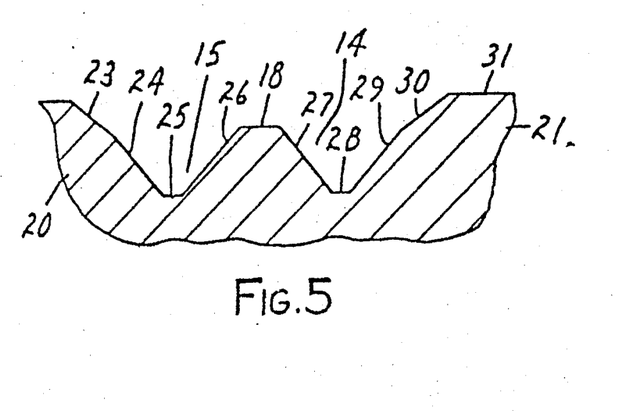
FIG. 5 is an enlarged fragmentary cross-sectional view of the sheet of FIG. 1.
Figure 6:
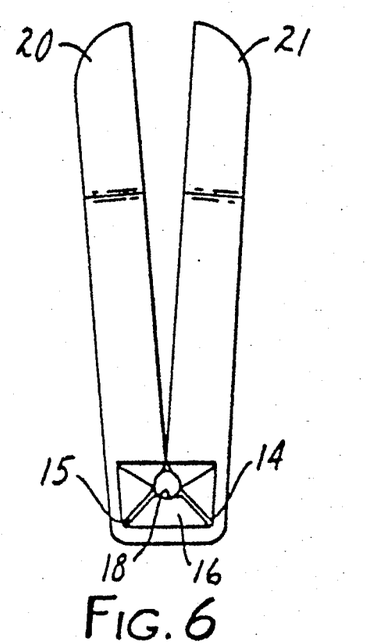
FIG. 6 is an end view of a splice element with an optical fiber disposed and clamped in the element.

Referring now to FIG. 5 there is shown in enlarged scale the shape of the grooves 14 and 15. The sheet is stamped, coined or molded from a sheet, wire, rod, powder or pellets to provide preferably nine surfaces formed in the face or surface 31 of the sheet 12. The surface 23 is disposed at an angle of 55° to a vertical line or line perpendicular to the face of the sheet to form one optical fiber supporting surface, surface 24 is disposed at an angle of 42.5° to the vertical line and together with surface 23 form one wall of the groove 15. The base of the groove is defined by a land area 25 along which the sheet 12 is folded to bend side portion 20 near a surface 26 forming a wall of the groove 15 and one side of the rib 16. The rib 16 has the surface 18 defining a support surface and the other wall or surface defining the rib is surface 27. The base of the groove 14 has a land area 28 joined to wall 27 and a first part or surface 29, corresponding to surface 24, and surface 30 corresponding to surface 23, forming the other wall of groove 14. Surfaces 26 and 27 are disposed at an angle of 42.5° to the vertical line. The surface 18 is recessed from the surface 31 of the sheet 12 sufficiently that when the sheet 12 is folded at the land areas 25 and 28 to dispose the side portions or legs 20 and 21 at 15 to 20° apart, the surfaces 23, 18 and 30 will be disposed to form a passageway to accept the desired sized fiber easily and engage the surface of a cylindrical fiber placed within the passageway at locations approximately 120° apart. This is generally illustrated in FIG. 6. Surfaces 18, 23, 24, 25, 26, 27, 28, 29, and 30 may also be curved slightly transversely about an axis instead of being planar and they are crowned slightly longitudinally. The only restriction on the surface geometry is that the 3 contact surfaces 23, 18, and 30 produce a channel with contact points or lines spaced at approximately 120° intervals around the circumference of the fiber and engage the fibers substantially uniformly along the length of the fiber ends in the element.

Figure 1:
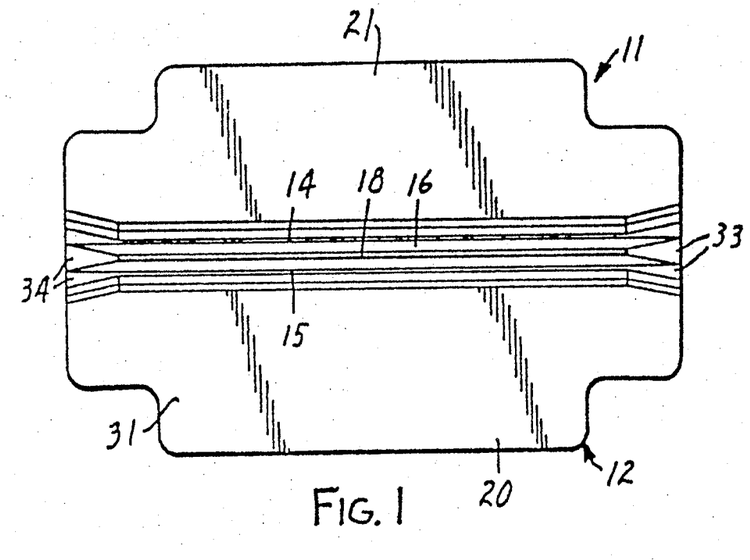
FIG. 1 is a plan view of the sheet forming the splice element.
Figure 2:
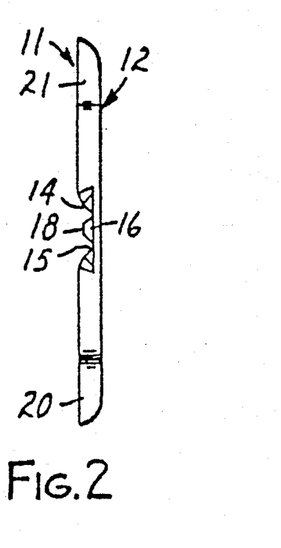
FIG. 2 is an end view of the sheet of FIG. 1.
Figure 3:
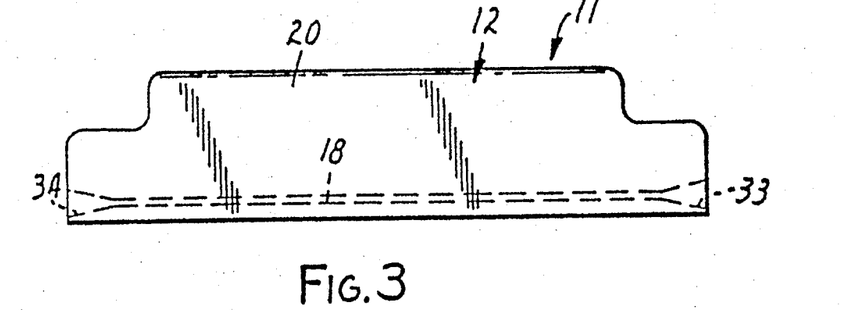
FIG. 3 is a side view of the splice element of the present invention.
Figure 4:
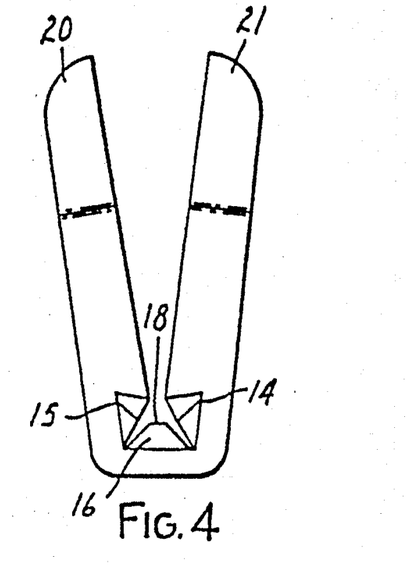
FIG. 4 is an end view of the splice element ready to accept an optical fiber and formed by folding the sheet of FIG. 1.

The sheet 12 is provided with bevelled or more rounded surfaces 33 and 34 at opposite ends of the rib and side walls of the grooves 14 and 15. These surface areas 33 and 34 preferably define a smooth bell-mouth entrance area to guide a fiber into the passageway defined by the surfaces 23, 18 and 30 of the splice element. These surfaces 33 and 34 also afford means limiting the amount of bending on the fiber such that it cannot be bent initially more than 15 to 20° at the splice element after a splice is formed.

The sheet 12 is preferably formed of a metal, such as an aluminum, from a sheet of 0.5 mm (0.020 inch) thick alloy 3003 with a temper of 0. The hardness of the material can be between 23 and 32 on the Brinell scale (BHN) and the tensile yield strength can be between 35 to 115 MPa (Mega pascals) (5 to 17 ksi). Another aluminum alloy is 1100 with a temper of 0, H14 or H15, together with a tensile yield strength and a hardness within the ranges. Both alloys provide a material which is much softer than the glass of the optical fiber and the cladding but ductile under the clamping pressures applied to the optical fibers. Such deformation is sufficient that the surfaces 23, 18 and 30 conform to the optical fibers contacted and should one fiber be larger than another, the surfaces will deform sufficiently to clamp onto both fiber ends and be deformed even by the smallest of the two fibers. Thus, the splice element 11 will center the cores of the optical fibers such that in aligned position 90% or better of the surfaces of the core portions of fiber ends will be aligned. The material of the sheet 12 is also resilient such that the elastic limit of the material in the hinge areas and lever means afforded by the side portions is not exceeded when the side portions are folded to contact and clamp a fiber therein. The elasticity of the material is such that the legs 20 and 21 will maintain a compressive force on the optical fiber after the splice is made to restrict the fibers from pulling out or the centers of the fibers from shifting from their position of alignment with each other. This continued spring compression also restricts any changes in the performance of the splice with changes in temperature. The reserve forces of this spring compression are always present when the splice has been completed.

The fiber ends are retained in the element such that the pull-out force will exceed the tensile strength of the glass fiber.

Other metals and metal alloys, or laminates thereof are useable to construct the sheet 12. Such metals include copper, tin, zinc, lead and alloys thereof. To have a clear splicing element, polymeric materials can be used and materials which are suitable include thermal forming grade polyethyleneterephthalate (PET) materials, e.g. film. A presently preferred film is a polyethyleneterephthalate glycol (PETG) film of about 0.5 mm (0.020 inch) thick. The material should have an elastic or tensile yield strength of between 21 to 115 MPa (3 to 17 ksi) and a hardness of between 13 and 32 on the Brinell scale to provide an element which is satisfactory to align the fiber ends and clamp the ends to restrict separation.

The splice element normally has a gel disposed in the area of the fiber receiving passageway which has index of refraction matching characteristics similar to the fiber core to improve the continuity of the transmission through the splice.

In a preferred example, the surface 18 has a width of 0.152 mm (0.0060 inch) and is recessed 0.109 mm (0.00433 inch) from the surface 31. From the center line through the rib 16 to the base of surfaces 26 or 27 is 0.317 mm (0.0125 inch), the width of surfaces 25 and 28 is 0.0838 mm (0.0033 inch). The distance from the center line through the rib 16 to the junction between surfaces 23 and 24 is 0.582 mm (0.0229 inch) and from the center line to the junction between surfaces 23 and 31 is 0.833 mm (0.0328 inch). The sheet 12 is normally 17. (0.7 inch) long by 7.62 mm (0.3 inch) wide along the major edges.

In tests, twenty sample elements were made using the geometry and dimensions defined above. Ten elements were made from 1100 series aluminum of 0 temper and ten samples were made in 1100 series aluminum of H15 temper. The same single mode fiber was used in making the splices in all sample elements. The average insertion loss for the H15 temper samples was approximately 0.10 db and for the 0 temper samples it was approximately 0.15 db. In thermal cycling tests where the elements were subjected to 78° C. for one hour, room temperature for one hour, one hour at −40° C., one hour back at room temperature, etc., showed a variation of less than 0.1 db loss over two weeks. Tests for insertion loss were made using a Hewlett Packard Model 8154B, 1300 nm LED source and a Hewlett Packard Model 8152A Optical Average Power Meter.

Figure 7:
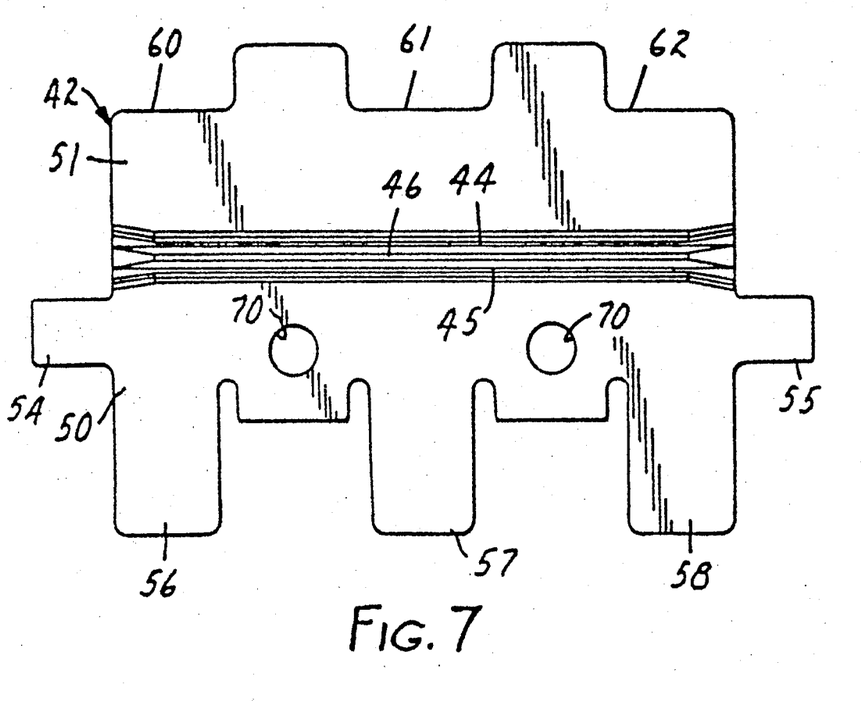
FIG. 7 is a plan view of a second embodiment of the sheet of FIG. 1.
Figure 8:
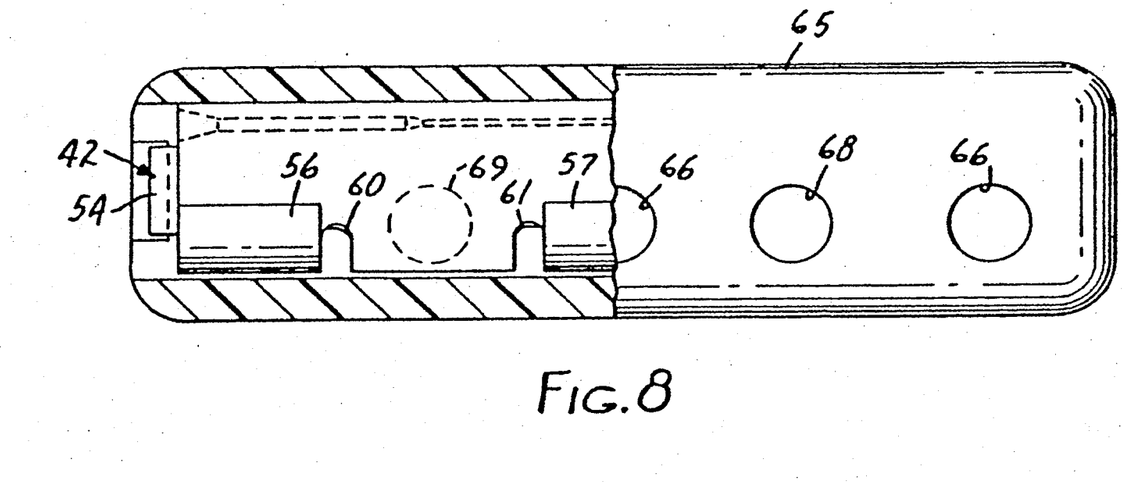
FIG. 8 is a plan view of a connector for making butt splices for optical fibers, partly in section to show interior portions.
Figure 9:
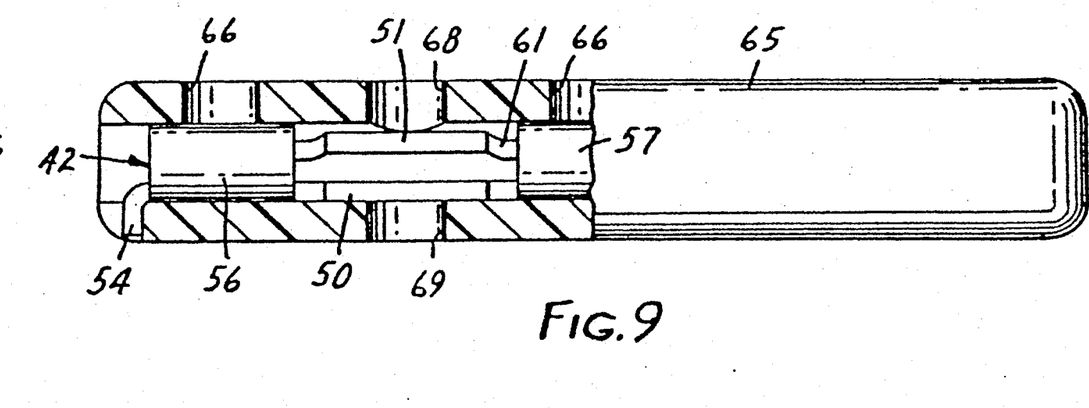
FIG. 9 is a front view of the splice connector of FIG. 8, partly in section to show interior portions.
Figure 10:
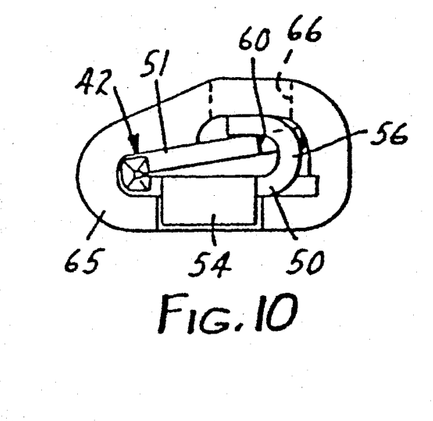
FIG. 10 is an end view of the connector of FIGS. 8 and 9.

FIG. 7 shows another embodiment of a sheet forming a splice element. In FIG. 7 the sheet 42 is formed generally to correspond to the sheet 12 in that it has two grooves 44 and 45, a rib 46 and side portions or legs 50 and 51. The outer profile of the sheet 42 differs from sheet 12 however in that the leg 50 has end tabs 54 and 55 and projecting edge flaps 56, 57 and 58 which are adapted to be bent over the leg 51 in the slotted areas 60, 61 and 62. The tabs 54 and 55 serve to hold the splice element 40 in place in a housing 65 for the splice element as seen in FIG. 10. The general size and dimensions of element 40 correspond to those of element 11.

After the sheet 42 has been folded along the grooves 44 and 45, index matching gel is placed inside the passageway of the element and the flaps 56, 57 and 58 are folded to positions over the leg 51. The splice element is then placed in a housing 65 from one end and the tabs 54 and 55 are folded to engage the ends of the housing. The housing 65 may be formed as an extrusion and then cut and drilled to form access openings 66 to permit a tool to engage the flaps 56, 57 and 58 to apply the clamping pressure onto the legs 50 and 51 and to further fold the flaps to maintain the legs in closed clamping position. The housing 65 may also be injection molded. Additional openings 68 in the housing permit a tool to engage the tongues on leg 51 between the slotted areas 60, 61 and 62 to make a temporary splice which can reopen due to the resilience of the element 42 and not deform the flaps 56, 57 and 58. After the flaps 56, 57 and 58 are deformed, it is still possible to reopen the splice element by introducing a tool through openings 69 in the housing (only one of which is shown) which openings are aligned with openings 70 in the leg 50. The openings allow pressure to be exerted by the tool against the leg 51 to separate it from the leg 50 and deform the flaps 56, 57 and 58 to release the clamping force on a pair of optical fibers.

Figure 11:
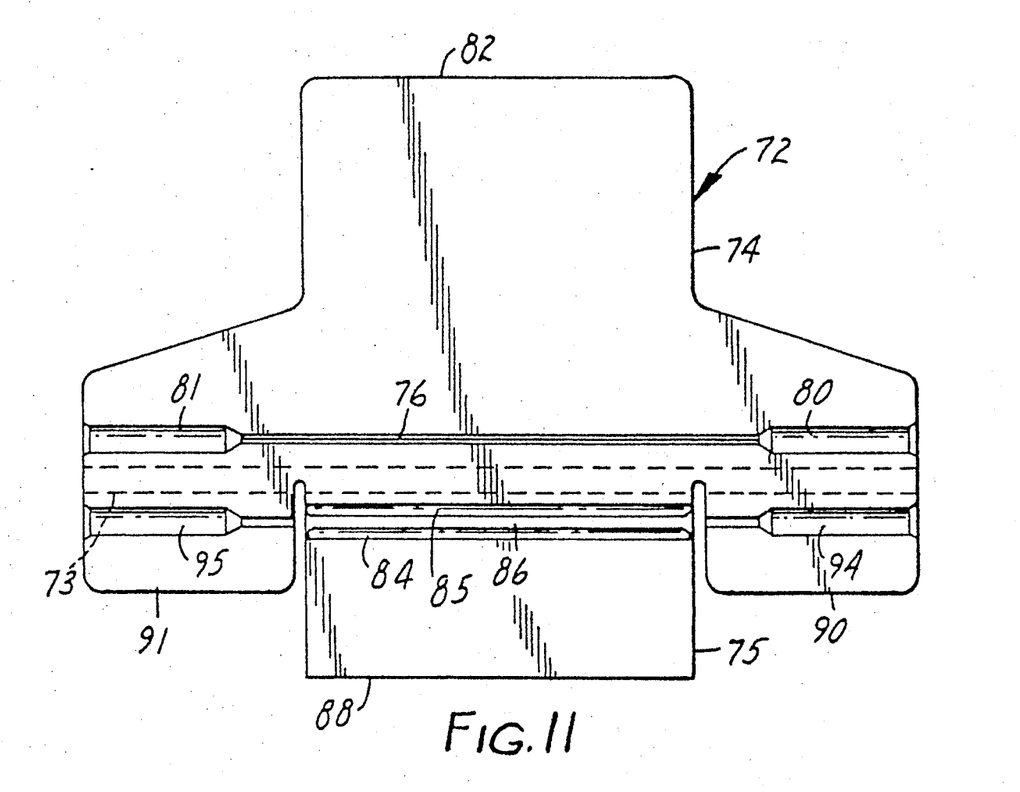
FIG. 11 is a plan view of a third embodiment of a sheet forming the splice element.

FIG. 11 shows another embodiment of a sheet forming a splice element. In FIG. 11 the sheet 72 is formed with a profile different than that of the sheet 12 or the sheet 42. Sheet 72 has a portion of reduced thickness, formed by a groove 73 which extends generally the length of the sheet 72. This groove separates the sheet into a first plate-like member or leg 74 and a second plate-like member or leg 75, and the groove 73 forms a fold line along which the sheet is folded to afford relative movement of the legs 74 and 75 to bring the legs toward one another. The plate-like leg 74 has a single V groove 76 running lengthwise of the sheet, which V groove is formed with two angularly positioned generally planar fiber supporting surfaces 78 and 79. The V grove has ends and at the ends adjacent the ends of the sheet 72 are concave recesses 80 and 81, respectively which are joined to conical surfaces. The V groove 76 is positioned parallel to the groove 73 and closer to the groove 73 than the edge 82.

The plate-like leg 75 is joined to the plate-like leg 74 along the fold line formed by groove 73. The leg 74, as illustrated, has a pair of spaced concave parallel recesses 84 and 85 extending lengthwise thereof and the surface 86 therebetween defines the third of three fiber supporting surfaces of an optical fiber passageway into which the ends of the fibers to be joined are positioned. The leg 75 has an edge 88 spaced from the fold line 73, which edge is not spaced as great a distance as the edge 82 to permit the edge 82 to be folded over the edge 88 as will be explained below. The edge 88 is joined to the portion of the sheet 72 of reduced thickness at the groove 73 by end walls. Also connected to the portion of the sheet 72 of reduced thickness are wings 90 and 91. The wings 90 and 91 extend away from the portion of reduced thickness, one adjacent each end wall of the leg 75. The wings 90 and 91 are formed with recesses 94 and 95, which are aligned with the third fiber supporting surface 86. The recesses 94 and 95 cooperate with the concave recesses 80 and 81, and the conical surfaces to define funnel-shaped fiber guiding openings for directing the fiber ends to the fiber receiving passageway defined by the surfaces 78, 79 and 86, when the first and second plate-like legs 74 and 75 are folded to form said fiber receiving passageway. The funnel-shaped openings and the slight crown along the length of the surfaces 78, 79 and 86 guide the fiber ends into the passageway and position them to be properly aligned when the element is closed.

Figures 12, 14:
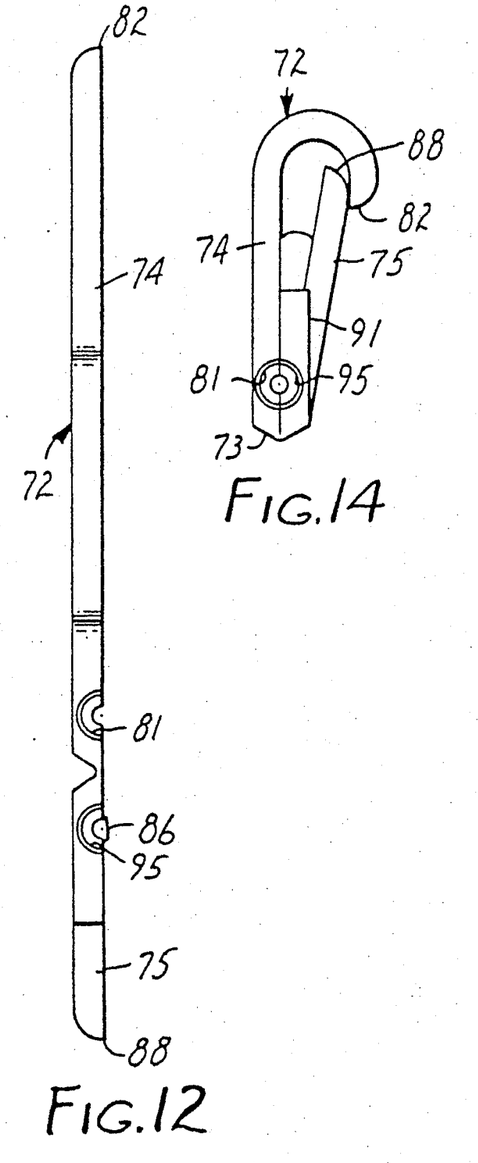
FIG. 12 is an end view of the sheet of FIG. 11.
FIG. 14 is an end view of a completed splice formed of the sheet of FIG. 11.
Figure 13:
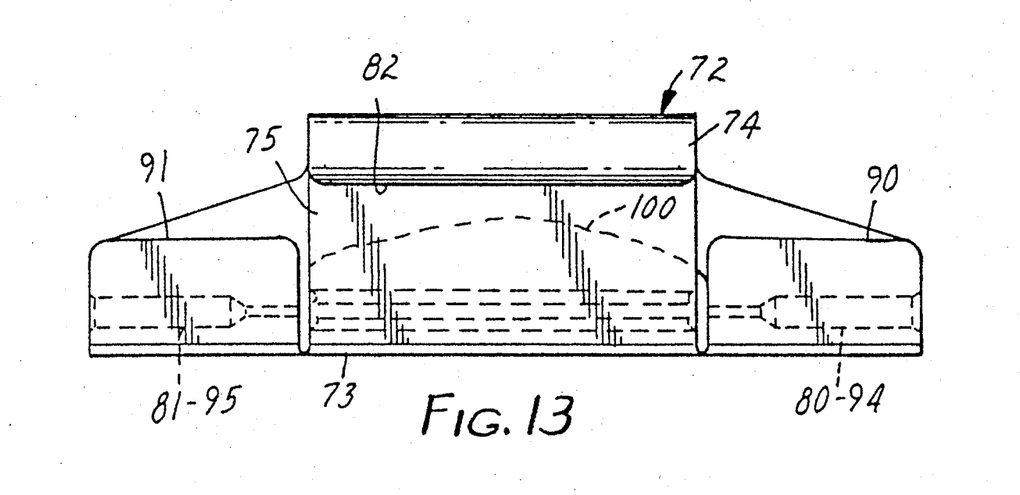
FIG. 13 is a side view of a splice element formed from the sheet of FIG. 11.
Figure 15:
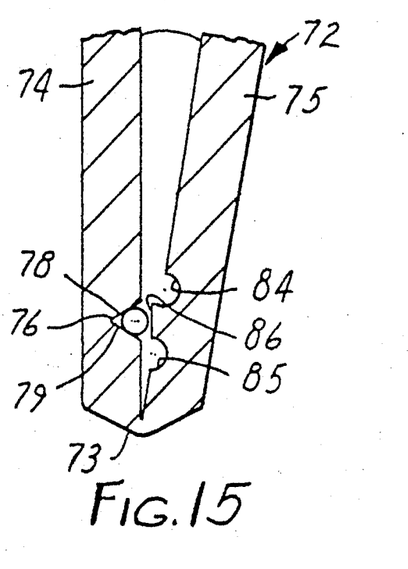
FIG. 15 is an enlarged fragmentary cross sectional view of the splice element of FIG. 13 before closing on an optical fiber.
Figure 16:
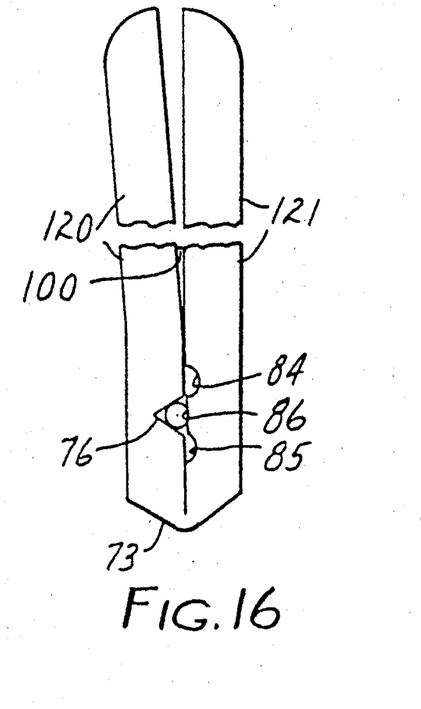
FIG. 16 is an enlarged fragmentary cross section of a splice element having aligning surfaces corresponding to the element of FIGS. 11 to 15 and legs corresponding to the element of FIGS. 4 and 6.

As shown in FIGS. 13 and 14, the sheet 72 is folded along the reduced portion defined by the groove 73, to bring the legs 74 and 75 to the position as illustrated in FIG. 15. The wings 90 and 91 are also folded flat against the leg 74 and the concave recesses 80 and 81, together with the recesses 94 and 95, form openings as illustrated in FIG. 14 into which the fiber ends can be directed to guide them into the fiber receiving passageway between the legs 74 and 75. The fiber ends are inserted into the passageway formed by the surfaces 78, 79 and 86. An index matching gel 100 is placed in the passageway. The legs 74 and 75 are then moved together to tightly clamp the fibers and embed the ends of the fibers into the fiber supporting surfaces generally as illustrated in FIG. 16. This occurs when the top edge of the leg 74 is closed over the edge 88 of the leg 75 to hold the legs in clamping position on the fiber ends maintaining them in axially aligned position. The deformable material of the element permits the element to be reopened to separate the fiber ends.

FIG. 16 also illustrates a modified element having legs 120 and 121, which have generally the same length and are formed like the legs 20 and 21, in that the upper ends are rounded to define an arcuate outer edge. The legs 120 and 121 are thus shaped to receive an external cap member which can force the legs toward one another to clamp the fiber ends. Such an element can have a profile to fit in a splice element constructed according to U.S. Pat. No. 4,818,055, the disclosure of which is incorporated herein by reference.

The V groove 76 in the leg 74 or 120 has the surfaces 78 and 79 disposed at generally 60° to each other. The elements are formed of the materials described above with reference to the embodiments of FIGS. 1 through 7, inclusive.

Having disclosed a preferred embodiment of the splicing element and modifications thereof, it is to be understood that other modifications can be made without departing from the spirit or scope of the invention as defined in the appended claims.

I claim:
1. A splice element for use in splicing two abutting ends of optical fibers which generally have different diameters due to manufacturing tolerances, said element being formed from a deformable material and comprising means defining three generally planar fiber supporting surfaces disposed with each surface positioned at an acute angle to a second surface and defining an optical fiber passageway therebetween adapted to receive therein two fiber ends in abutting relationship to be spliced together, said passageway having a generally triangular cross-section, and means for supporting at least one of said fiber supporting surfaces for movement in relationship to the other fiber supporting surfaces to draw said one of said supporting surfaces toward the other of said surfaces with sufficient force to engage two fiber ends and cause each said fiber supporting surface to deform uniformly around said fiber ends with a larger of said fiber ends being embedded uniformly into each of said three fiber supporting surfaces forming said fiber passageway to a slightly greater depth than said smaller diameter fiber to accommodate said variations in fiber diameter due to manufacturing tolerances but resulting in two said fiber ends being brought into coaxial alignment and for clamping said fiber ends with sufficient compressive force to restrict said fiber ends from being pulled out of said fiber alignment passageway and insufficient force to be deleterious to said optical fibers.

2. A splice element according to claim 1 wherein said element is formed of an integral sheet of deformable material having sufficient tensile yield strength to apply said clamping forces on said fiber ends.

3. A splice element according to claim 2 wherein said deformable material has a tensile yield strength of between 21 and 115 MPa.

4. A splice element according to claim 3 wherein said deformable material is metal.

5. A splice element according to claim 4 wherein said metal is an aluminum alloy.

6. A splice element according to claim 1 wherein said deformable material has an elastic yield strength of between 35 and 115 MPa.

7. A splice element according to claim 6 wherein said deformable material is metal.

8. A splice element according to claim 7 wherein said metal is an aluminum alloy.

9. A splice element according to claim 1 wherein said deformable material is a thermal forming grade polyethyleneterephthalate having a tensile yield strength of between 21 and 115 MPa.

10. A sp element according to claim 1 wherein said means for supporting at least one of said fiber supporting surfaces is a leg supporting at least one of said fiber supporting surfaces and connected along a fold line to a leg supporting a pair of said fiber supporting surfaces.

11. A splice element according to claim 10 wherein said deformable material is a metal alloy having a tensile yield strength of between 35 and 115 MPa.

12. A splice element for use in splicing two abutting ends of optical fibers which generally have different diameters due to manufacturing tolerances, said element being formed from ductile, deformable, elastic material and comprising means defining three generally planar fiber supporting surfaces, said three fiber supporting surfaces being disposed with each surface positioned at an acute angle to a second surface and defining an optical fiber passageway therebetween adapted for receiving two fiber ends to be spliced together, said passageway having a generally triangular cross-section, means for supporting at least one of said fiber supporting surfaces for movement in relationship to the other fiber supporting surfaces to draw said one of said supporting surfaces toward the other of said supporting surfaces and to apply sufficient force against two said fiber ends to force said fiber ends against said fiber supporting surfaces and to deform said material at said fiber supporting surfaces and embed a said fiber end of larger diameter uniformly in each said fiber supporting surface to a slightly different depth than the deformation from a said smaller diameter fiber end and deforming said fiber supporting surfaces for aligning the opposed fiber ends axially, and means for maintaining continued spring compression between said fiber supporting surfaces and said fiber ends for clamping said fiber ends in said element.

13. A splice element according to claim 12 wherein said deformable material has a tensile yield strength of between 21 and 115 MPa.

14. A splice element according to claim 13 wherein said deformable material is a thermal forming grade polyethyleneterephthalate.

15. A splice element for use in splicing two abutting ends of optical fibers which generally have different diameters due to manufacturing tolerances, said element being formed from a deformable material and comprising means defining three generally planar fiber supporting surfaces disposed with each surface positioned at an acute angle to a second surface and defining an optical fiber passageway therebetween adapted to receive therein two fiber ends in abutting relationship to be spliced together, said passageway having a generally triangular cross-section and having first means for supporting a pair of said fiber supporting surfaces in angular relationship to each other, and second means for supporting a the third of said fiber supporting surfaces for movement in relationship to the other fiber supporting surfaces to draw said one of said supporting surfaces toward said pair of fiber supporting surfaces with sufficient force to engage two fiber ends and cause each said fiber supporting surface to deform uniformly around said fiber ends with a larger of said fiber ends being embedded into each of said three fiber supporting surfaces forming said fiber passageway to a slightly greater depth than said smaller diameter fiber to accommodate said variations in fiber diameter due to manufacturing tolerances but resulting in two said fiber ends being brought into coaxial alignment and for clamping said fiber ends with sufficient compressive force to restrict said fiber ends from being pulled out of said fiber alignment passageway and insufficient force to be deleterious to said optical fibers.

16. A splice element according to claim 15 wherein said first means and said second means are part of a continuous metal piece having a portion reduced in thickness between said pair of fiber supporting surfaces and said third fiber supporting surface to define a fold line affording the movement of said other fiber supporting surface in relationship to said pair of fiber supporting surfaces.

17. A splice element according to claim 15 wherein said first means comprises a first plate-like member having one edge defined by said portion of reduced thickness and a second edge spaced from said one edge, and wherein said second means comprises a second plate-like member having one edge defined by said portion of reduced thickness and a second edge spaced from said portion a distance less than said second edge of said first means whereby said first plate-like member may be folded over the second edge of said second plate-like member to hold said third fiber supporting surface in close spaced fiber embedding and clamping position in relationship to said pair of fiber supporting surfaces of said first means.

18. A splice element according to claim 15 wherein said three generally planar fiber supporting surfaces each have opposite ends, and the ends of said pair of fiber supporting surfaces terminate in communication with concave recesses formed to guide the ends of fibers into said passageway and said third fiber supporting surface has the opposite ends thereof communicating with concave recesses adjacent said ends.

19. A splice element according to claim 15 wherein said third fiber supporting surface has a groove formed parallel to and along each side thereof.

20. A splice element according to claim 17 wherein said second plate-like member has end walls joining said second edge and extending toward said portion of reduced thickness, and said metal piece has a pair of wings extending away from said portion of reduced thickness, one adjacent each end wall of said second plate-like member.

21. A splice element according to claim 15 wherein said three generally planar fiber supporting surfaces each have opposite ends, and the ends of said pair of fiber supporting surfaces terminate in communication with concave recesses formed to guide the ends of fibers into said passageway and said third fiber supporting surface has the opposite ends thereof communicating with convex surfaces adjacent said ends, and said wings are formed with recesses aligned with said third fiber supporting surface, which recesses cooperate with said concave recesses to form funnel-like openings to direct the ends of optical fibers into said passageway when said first and second plate-like members are folded to form said fiber receiving passageway.

22. A splice element according to claim 15 wherein said deformable material is an aluminum alloy having an elastic yield strength of between 35 and 115 MPa.

23. A splice element according to claim 15 wherein said deformable material has a tensile yield strength of between 21 and 115 MPa.

24. A splice element according to claim 23 wherein said deformable material is a thermal forming grade polyethyleneterephthalate.

* * * * *

UNITED STATES PATENT AND TRADEMARK OFFICE
CERTIFICATE OF CORRECTION

PATENT NO. : 5,013,123

DATED : May 7, 1991

INVENTOR(S) : Richard A. Patterson

It is certified that error appears in the above-identified patent and that said Letters Patent is hereby corrected as shown below:

Column 1, Line 26, "t" should read --the--.

Column 6, Line 35, "17." should read --17.78 mm--.

Column 8, Line 35, "materials" should read --same materials--.

Column 9, Line 26, "sp" should read --splice--.

Signed and Sealed this

Thirteenth Day of July, 1993

Attest:

MICHAEL K. KIRK

*Attesting Officer*  *Acting Commissioner of Patents and Trademarks*